(12) United States Patent
Krüger et al.

(10) Patent No.: US 10,407,291 B2
(45) Date of Patent: Sep. 10, 2019

(54) CARTRIDGE FOR A BEVERAGE OR FOOD SUBSTRATE

(71) Applicant: Freezio AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: Freezio AG, Amriswil (CH)

( * ) Notice: Subject to any disclaimer, the term of this patent is extended or adjusted under 35 U.S.C. 154(b) by 0 days.

(21) Appl. No.: 16/069,732

(22) PCT Filed: Jan. 12, 2017

(86) PCT No.: PCT/EP2017/050563
§ 371 (c)(1),
(2) Date: Jul. 12, 2018

(87) PCT Pub. No.: WO2017/121798
PCT Pub. Date: Jul. 20, 2017

(65) Prior Publication Data
US 2019/0023552 A1    Jan. 24, 2019

(30) Foreign Application Priority Data

Jul. 1, 2016 (DE) .................. 10 2016 212 013

(51) Int. Cl.
*B67D 1/00* (2006.01)
*B67D 1/04* (2006.01)
(Continued)

(52) U.S. Cl.
CPC .............. *B67D 1/0079* (2013.01); *A23L 2/54* (2013.01); *A47J 31/407* (2013.01);
(Continued)

(58) Field of Classification Search
CPC ...... B67D 1/0079; B67D 1/0046; B67D 1/04; A47K 31/407; B65D 85/8043
(Continued)

(56) References Cited

U.S. PATENT DOCUMENTS 4,314,768 A   2/1982  Goglio et al.
4,376,496 A   3/1983  Sedam et al.
(Continued)

FOREIGN PATENT DOCUMENTS

DE       29825074 U1    9/2004
DE    102009049945 A1   4/2011
(Continued)

OTHER PUBLICATIONS

International Search Report for International Application PCT/EP2017/050563, dated May 8, 2017.
(Continued)

*Primary Examiner* — Jeremy Carroll
(74) *Attorney, Agent, or Firm* — The Dobrusin Law Firm, P.C.; Daniela M. Thompson-Walters

(57) ABSTRACT

The invention relates to a cartridge comprising a wall region, to one end of which a connection region is connected, which is closed particularly with a membrane, and on the opposite end of which optionally a bottom region is provided, the wall region and optionally the bottom region containing a cavity which receives a beverage and/or food substrate.

17 Claims, 9 Drawing Sheets

(51) Int. Cl.
  *B67D 1/08*    (2006.01)
  *B65D 85/804*   (2006.01)
  *A47J 31/40*    (2006.01)
  *A47J 31/44*    (2006.01)
  *B67D 7/02*    (2010.01)
  *A23L 2/54*    (2006.01)

(52) U.S. Cl.
  CPC ....... *A47J 31/4425* (2013.01); *A47J 31/4492* (2013.01); *B65D 85/8043* (2013.01); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *B67D 2001/0811* (2013.01); *B67D 2001/0812* (2013.01)

(58) Field of Classification Search
  USPC ...................................................... 222/145.6
  See application file for complete search history.

(56) References Cited

U.S. PATENT DOCUMENTS

| | | | |
|---|---|---|---|
| 5,836,482 | A | 11/1998 | Ophardt |
| 6,971,549 | B2 * | 12/2005 | Leifheit ................. A47K 3/281 141/330 |
| 2002/0130140 | A1 | 9/2002 | Cote |
| 2003/0000964 | A1 | 1/2003 | Schroeder et al. |
| 2003/0071058 | A1 * | 4/2003 | Studer .................... A47K 5/12 222/88 |
| 2006/0249536 | A1 | 11/2006 | Hartman et al. |
| 2008/0029541 | A1 | 2/2008 | Wallace et al. |
| 2009/0308488 | A1 | 12/2009 | Bennett |
| 2010/0193544 | A1 * | 8/2010 | Rusch ....................... B67B 7/28 222/82 |
| 2012/0121780 | A1 | 5/2012 | Lai et al. |
| 2012/0207893 | A1 | 8/2012 | Krüger |
| 2016/0297664 | A1 * | 10/2016 | Broodryk ............. B67D 3/0035 |

FOREIGN PATENT DOCUMENTS

| | | |
|---|---|---|
| DE | 102009052513 A1 | 5/2011 |
| EP | 1671568 A2 | 6/2006 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2923772 A1 | 9/2015 |
| GB | 2020631 A | 11/1979 |
| GB | 2033333 A | 5/1980 |
| GB | 2416757 A | 2/2006 |
| WO | 1996/036556 A1 | 11/1996 |
| WO | 98/05586 A1 | 2/1998 |
| WO | 01/21292 A1 | 3/2001 |
| WO | 2004/099060 A2 | 11/2004 |
| WO | 2005/079361 A2 | 9/2005 |
| WO | 2006/005401 A2 | 1/2006 |
| WO | 2011/084603 A1 | 7/2011 |
| WO | 2013/036564 A2 | 3/2013 |

OTHER PUBLICATIONS

International Preliminary Report on Patentability for International Application PCT/EP2017/050563, dated Mar. 16, 2018.

* cited by examiner

CARTRIDGE FOR A BEVERAGE OR FOOD SUBSTRATE

BACKGROUND

The invention relates to a cartridge having a wall region, one end of which is adjoined by a connecting region which is closed, in particular by a membrane, and at the opposite end of which optionally a bottom region is provided, wherein the wall region and optionally the bottom region define a cavity which accommodates a beverage substrate and/or foodstuff substrate.

Cartridges of this kind are known from the prior art, for example from EP 1 671 568 A2 and WO 2011/084603 A1, and are used for example to produce cold beverages. In the process, the cartridge is inserted into a dispenser and the beverage substrate which is located in the cartridge is blended with a solvent, in particular water. In the past, there have often been problems in such systems with the insertion of the cartridge into the dispenser and/or with the sealing off of the cartridge/dispenser interface.

SUMMARY

Therefore, it was the object of the present invention to provide a cartridge which does not have the drawbacks of the prior art.

This object is achieved by a cartridge having a wall region, one end of which is adjoined by a connecting region which is closed in particular by a membrane, and at the opposite end of which optionally a bottom region is provided, wherein the wall region and optionally the bottom region define a cavity which accommodates a beverage substrate and/or foodstuff substrate, wherein the connecting region has at least one flange which is provided with a positioning means and/or covering means, wherein the positioning means comprises a rectilinear circumferential region of the at least one flange, wherein the circumference of the flange is formed in a curved manner away from the rectilinear circumferential region, and wherein a neck is provided between the wall region and the connecting region.

The statements made with regard to this subject of the present invention apply equally to the other subjects of the present invention and vice versa.

The present invention relates to a cartridge, which is produced preferably from plastic, in particular by a molding and/or blow-molding process. The cartridge has a side wall which has for example at least partially a round, rectangular, square, conical or oval cross section. A bottom is generally provided, in particular in one piece, at one end of the side wall. The side wall and optionally the bottom region define a cavity in which a beverage substrate and/or foodstuff substrate, in particular in liquid form, is provided. Provided at the other end of the wall region is a connecting region by way of which the cartridge is connected to a cartridge receptacle. This cartridge receptacle can be part of a dispenser or a component separate from the dispenser.

According to the invention, the connecting region is provided such that it has at least one flange. The flange protrudes from the connecting region and projects from a wall region of the connecting region preferably at an angle, particularly preferably at right angles. In order to produce the beverage or foodstuff, the flange is oriented preferably horizontally. Preferably, the flange is made of solid material, i.e. not manufactured in a hollow manner.

Also according to the invention, the flange is provided with a positioning and/or covering means. The positioning means ensures that the cartridge can be arranged on the dispenser and/or on the cartridge receptacle only in a particular position, in particular at a particular angle of rotation, in particular with regard to the longitudinal center axis of the cartridge. The covering means covers a region, in particular a region through which the finished beverage or foodstuff flows out. Preferably, the positioning means and the covering means are identical.

Preferably, the cartridge has two flanges which are arranged in an offset manner with respect to one another in the longitudinal direction. Either only one of the two flanges or both flanges has the positioning means and/or covering means.

Preferably, the positioning means and/or covering means is an indentation and/or protuberance which protrudes from the flange, in particular the circumference thereof.

Preferably, the positioning means and/or covering means is provided in one piece with the flange. For example, the positioning means and/or covering means is configured as a lug which is integrally formed at one point on the circumference of the flange. The thickness of the positioning means and/or covering means corresponds in this case at least substantially to the thickness of the flange.

Particularly preferably, the positioning means and/or covering means comprises a rectilinear circumferential region of the at least one flange. The flange is configured in particular such that its circumference away from the rectilinear circumferential region is curved. The shape of the flange in a plane perpendicular to the longitudinal axis (also referred to as cross section or cross-sectional plane) is thus oval or round with a flat or rectilinear side which forms the positioning means and/or covering means. The flattened side can be used to fix the orientation of the cartridge about its longitudinal axis. Particularly preferably, an edge extending parallel to the longitudinal axis of the cartridge is formed in each transition region between the rectilinear circumferential region and the curved circumferential region. Typically, the flange has exactly two of such edges, specifically in each case one edge at one end of the flattened region. It is also advantageously possible to fix a clear orientation of the cartridge on the basis of the edges.

According to one preferred embodiment, a neck is provided between the wall region and the connecting region. This neck can have for example a round cross section. The neck represents the wall region of the connecting region. The flange adjoins the neck preferably at right angles.

Preferably, the membrane which closes, in particular hermetically seals, the cartridge before it is used, is provided on the flange or one of the two flanges, in particular the end face thereof, in particular in a sealed manner. To this end, the flange, in particular the end face thereof, can have a bead, in particular a bead in the form of a circular ring, which cooperates with the sealing tool during sealing. Preferably, the outer circumference of the membrane is less than the outer circumference of the flange. When two flanges are realized, the membrane is then provided preferably only on the outer flange.

Preferably, a fastening means is provided in the wall region and/or in the region of the neck.

By way of this fastening means, the cartridge can be connected to a dispenser. The fastening means can be for example a groove in which a fastening means on the dispenser engages.

Preferably, the cartridge has an identifier, with which it is possible to individualize the cartridge. This identifier can be for example a means which is read by a reader on the dispenser using electromagnetic signals and/or mechanical means. For example, the identifier is a barcode, an impression which modifies and/or absorbs electromagnetic waves, for example light that is reflected thereby, or a FID or RFID. The identifier can contain for example information about the producer of the capsule, the contents of the capsule and/or the expiration date. On the basis of this information, the dispenser can ascertain whether a beverage or foodstuff is being produced at all, and if so when, which one and under which conditions. For example, the quantity of water which is blended with the substrate can be defined automatically and/or it is possible to determine whether the water is intended to be carbonated.

Preferably, the individualization is rendered unusable after the cartridge has been used. This can take place with electromagnetic radiation and/or mechanically, the latter for example when the cartridge and the cartridge receptacle described below are moved relative to one another.

A further subject of the present invention is a system having the cartridge according to the invention and a cartridge receptacle which is provided in the connecting region of the cartridge.

The statements made with regard to this subject of the present invention apply equally to the other subjects of the present invention and vice versa.

This subject of the present invention relates to a system consisting of the cartridge according to the invention and a cartridge receptacle. The cartridge receptacle can be connected fixedly to the cartridge or be a replacement part which is removed from the cartridge after the latter has been used, and is connected to a new cartridge. Preferably, the cartridge receptacle is made of plastic, in particular by injection-molding. Preferably, the cartridge receptacle is connected to a dispenser.

The cartridge receptacle may have a piercing means which perforates the membrane such that the beverage substrate and/or foodstuff substrate flows in particular at the into a cavity, in particular a mixing chamber of the cartridge receptacle. Furthermore, the cartridge receptacle preferably has a diluent, in particular water, inflow. In the mixing chamber that is preferably present, the beverage substrate and/or foodstuff substrate can be mixed with the diluent. The finished beverage or foodstuff then runs out via a beverage and/or foodstuff outflow.

According to a preferred embodiment, the diluent, in particular water, inflow and the beverage and/or foodstuff outflow are provided at opposite ends of the cartridge receptacle. Located in between is the mixing chamber, in which the beverage substrate and/or foodstuff substrate is mixed with the diluent. This preferred embodiment of the present invention has the advantage that particularly good blending between the two components takes place.

Preferably, the piercing means is provided in a manner aligned with the diluent, in particular water, inflow and the beverage and/or foodstuff outflow. As soon as the membrane has been pierced, the beverage substrate and/or foodstuff substrate flows in particular past the piercing means and into the mixing chamber on account of gravity and/or pressure. As a result of the preferred arrangement of the piercing means, particularly good mixing between the beverage substrate and/or foodstuff substrate and the solvent is again achieved.

Preferably, with regard to the direction of flow of the solvent, the flow cross section of the mixing chamber first expands and then narrows again, before the finished beverage leaves the mixing chamber.

Preferably, the covering means, which is provided on the flange of the cartridge, covers the beverage and/or foodstuff outflow of the cartridge receptacle.

Preferably, the flange on the cartridge, in particular the circumference thereof, cooperates in a sealing manner with the cartridge receptacle. To this end, the circumference of the flange can engage for example in a groove in the cartridge receptacle. This flange/groove connection can also serve as a force-fit, in order to prevent the cartridge from shifting relative to the cartridge receptacle during beverage or foodstuff production and the connection between the cartridge and cartridge receptacle losing its tightness.

According to one preferred embodiment, the cartridge and the cartridge receptacle are provided to be longitudinally displaceable with respect to one another, in particular before the membrane is pierced. As a result of this longitudinal displacement, the piercing means can then be brought into engagement with the membrane and pierce the latter.

Preferably, the cartridge and the cartridge receptacle are connected together in a rotationally fixed manner.

Preferably, the piercing means has a channel. Through this channel, a gas can be pushed into the cartridge, which pushes the beverage substrate and/or foodstuff substrate out of the cartridge, in particular into the mixing space of the cartridge receptacle.

Preferably, the cartridge receptacle has a spike guide, wherein the piercing means is mounted in a displaceable manner within the spike guide, wherein the piercing means is displaceable between a retracted position, in which the piercing means is away from the membrane, and an extended position, in which the piercing means pierces the membrane of the cartridge and projects into the cartridge. Preferably at least one lateral channel for conveying the beverage substrate and/or foodstuff substrate in the direction of the mixing chamber when the membrane is pierced by the piercing means has been introduced into the outer wall of the piercing means. Furthermore, a compressed-air line is particularly preferably integrated into the piercing means, wherein a compressed-air connection for connecting to a compressed-air source is formed on a side of the piercing means that is remote from the cartridge, said compressed-air connection being accessible in particular from outside the cartridge receptacle, and wherein a on a side of the piercing means that faces the cartridge.

BRIEF DESCRIPTION OF DRAWINGS

In the following text, the invention is explained by way of FIGS. 1 to 12. These explanations are merely by way of example and do not limit the general concept according to the invention. The explanations apply to the cartridge according to the invention and to the system according to the invention equally.

DETAILED DESCRIPTION

Figure 1:
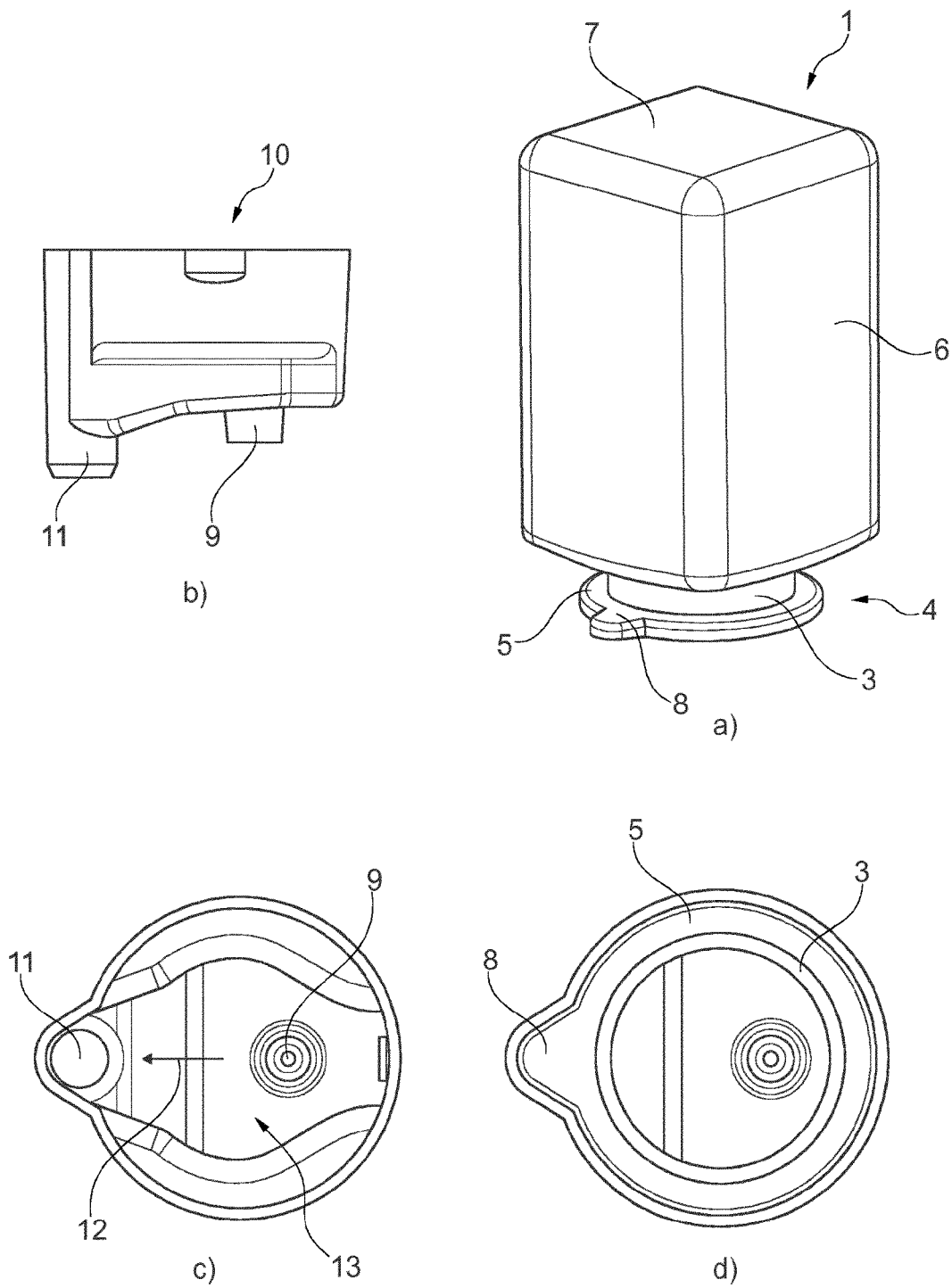
FIGS. 1-4 show a first embodiment of the system according to the invention.

FIGS. 1-4 show a first embodiment of the system according to the invention, which consists of a cartridge 1 and a cartridge receptacle 10. The cartridge is manufactured preferably from a plastic material, for example by injection-molding or by a blow-molding technique. The cartridge has an, in the present case square, wall region 6, an in this case upper end of which is adjoined by a bottom region 7. The wall region 6 and the bottom region 7 delimit a cavity in which the beverage substrate and/or foodstuff substrate, in particular a concentrate, is located, with which a beverage or foodstuff can be produced. At the opposite end of the wall region from the bottom region, in this case the lower end, a connecting region 4 is provided, which in the present case has a neck 3 and a flange 5. The cavity of the cartridge is hermetically sealed by a closure 14, in this case a membrane, after it has been filled. The membrane 14, in particular a plastic foil is connected to the flange preferably cohesively, in particular by sealing. By way of the connecting region, the cartridge is connected to a cartridge receptacle. A positioning and/or covering means 8, which in the present case is provided as a protuberance, in particular as a lug-like protuberance, is provided on the flange 5. The lug is in this case integrally formed on the flange. Furthermore, as can be gathered in particular from FIGS. 1b) and c), the system has a cartridge receptacle 10. This cartridge receptacle has a solvent, in particular water, inflow 15 (cf. FIG. 2) and a mixing chamber 13 in which the solvent and the beverage substrate and/or foodstuff substrate are mixed. The direction of flow of the mixture is indicated by the arrow 12 in FIG. 1c). The finished beverage/foodstuff leaves the mixing chamber through the beverage and/or foodstuff outflow 11 and is collected in a container, for example a glass. Furthermore, as can be gathered in particular from FIG. 2, the cartridge receptacle has a piercing means 16, in this case a spike 16, which, as can be seen in particular in FIG. 3, pierces the membrane, which is sealed to the flange region of the cartridge, such that the beverage substrate or foodstuff substrate can flow into the flow chamber 13 in particular along the outer face of the spike, which is provided preferably with outflow channels 17 on its outer side for this purpose.

Figure 2:
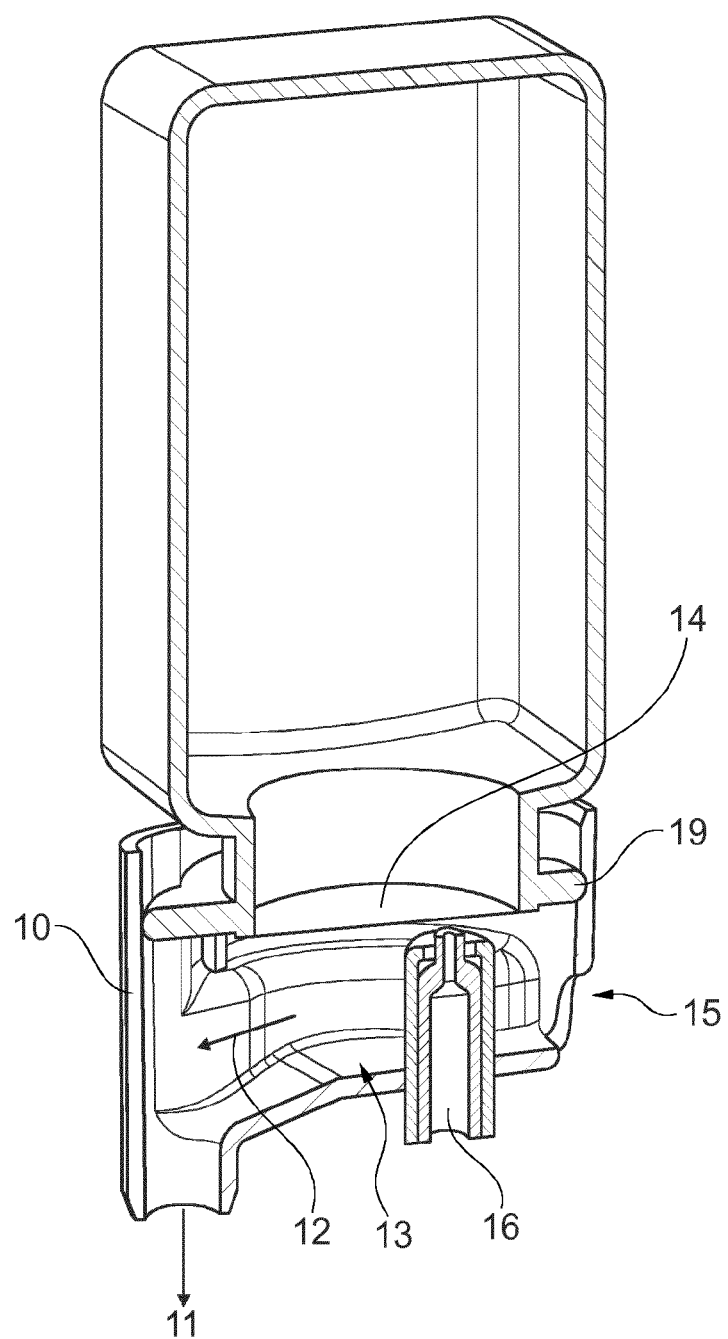
Figure 3:
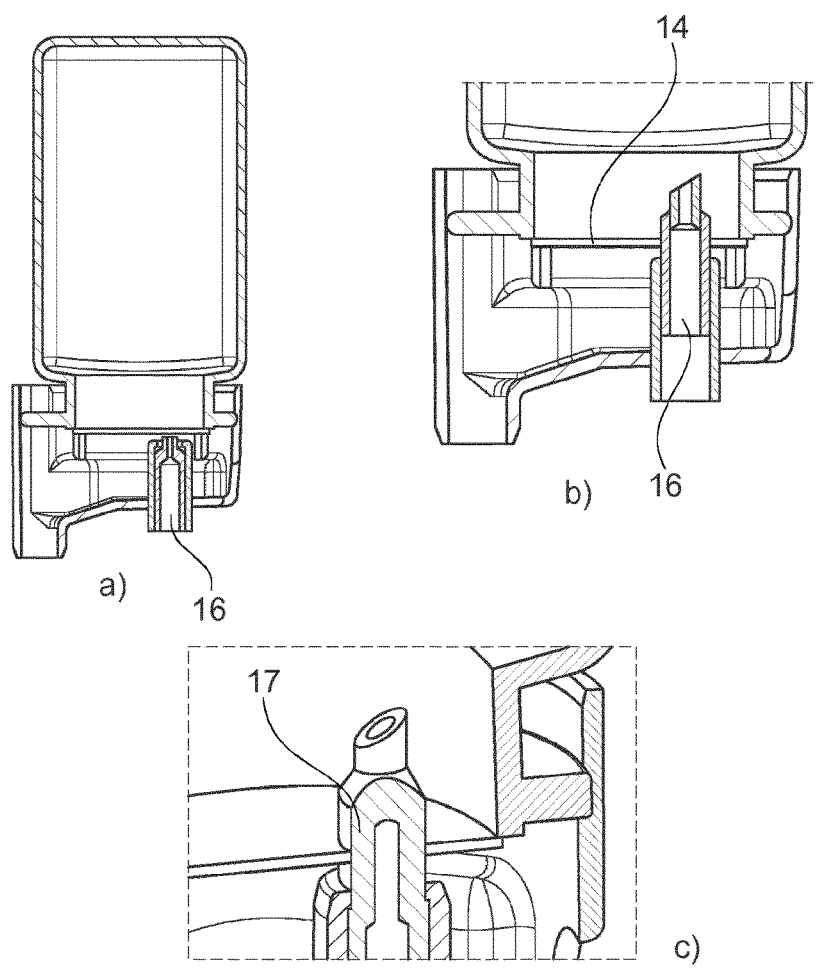

FIG. 2 shows the system before the piercing means 16 comes into engagement with the membrane 14. In order to achieve this, the cartridge and/or the cartridge receptacle are shifted longitudinally with respect to one another such that the spike 16 penetrates the membrane 14, this being clearly visible in particular from FIG. 3c). In said figure, the channels 17 through which the substrate flows into the mixing chamber can also be identified particularly well. The flow of the substrate into the mixing chamber can be accelerated and controlled in a targeted manner by gas which is pushed into the cartridge through a duct 18 in the piercing spike 16. For example, the pressure in the cartridge can be adapted to the volumetric flow of the solvent.

Figure 4:
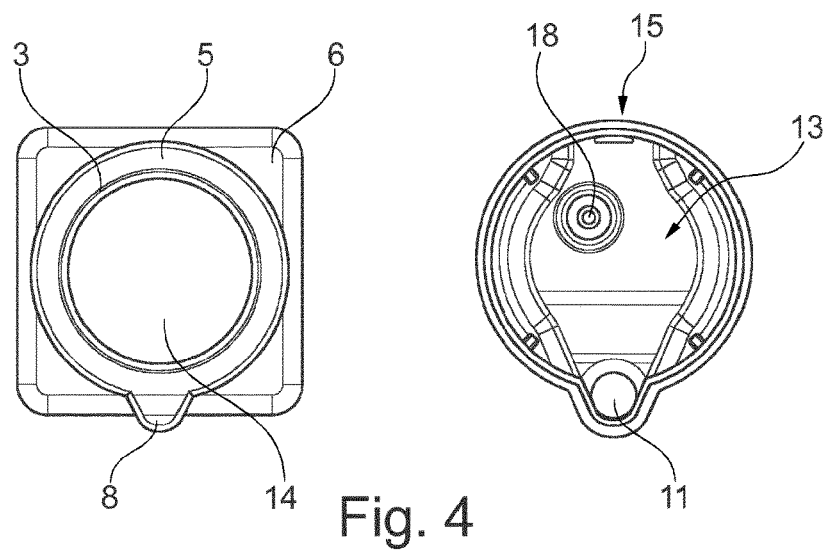

As can be gathered in particular from FIG. 1d) and FIG. 4, the flange 5 of the cartridge 1 cooperates in a sealing manner with the cartridge receptacle and as a result ensures that liquid leaves the mixing chamber only through the beverage and/or foodstuff outflow 11. Furthermore, it is apparent in particular from these figures that the protuberance 8 in the present case is not only a positioning means but also covers the beverage and/or foodstuff outflow 11 in the cartridge receptacle in particular in a sealing manner. The flange 8 and the protuberance 8 provided thereon can cooperate in a sealing manner, by way of their end face and/or by way of their circumference, with corresponding faces of the cartridge receptacle.

FIGS. 5-8 show a further embodiment of the system according to the invention. As regards the cartridge, reference can be made essentially to the statements made with regard to FIGS. 1 to 4, wherein the cartridge also has, in addition to the flange 5, a fastening means 20 in its connecting region, said fastening means 20 connecting the cartridge 1 to the cartridge receptacle 10. Furthermore, the wall region 6 has in the present case an indentation 24 which allows a longitudinal displacement between the cartridge and the cartridge receptacle and optionally a dispenser and which also represents a guide for the cartridge.

As regards the cartridge receptacle 10, too, reference can be made to the statements made with regard to FIGS. 1-4. However, as can be gathered in particular from FIG. 7, the cartridge receptacle in the present case has a fastening or securing ring 21 which is connected to the mixing chamber 13 by means of deformation and/or predetermined breaking points 22. This ring 21 cooperates in a force-fitting manner with the fastening means 20, for example in this case a collar 20 which is provided on the cartridge. Furthermore, it is clearly apparent from FIG. 7 that the cartridge receptacle 10, in addition to the spike 18, also has further piercing means 16. Through the spike 18, a gas is pushed into the cartridge, said gas pushing the substrate out of the cartridge. The opening means 16 cut into the membrane, in this case with angled cuts, which then form flaps which are pushed downward under the pressure of the substrate and thus allow the substrate to flow out more easily. A person skilled in the art will recognize that a piercing means 16 may also suffice, or that it is also possible to use the piercing of the membrane and the running out of the substrate as explained with reference to FIGS. 1-4 in the present case. Of course, the current opening means 16, 18 can also be transferred to the embodiment according to FIGS. 1 to 4.

Figure 5:
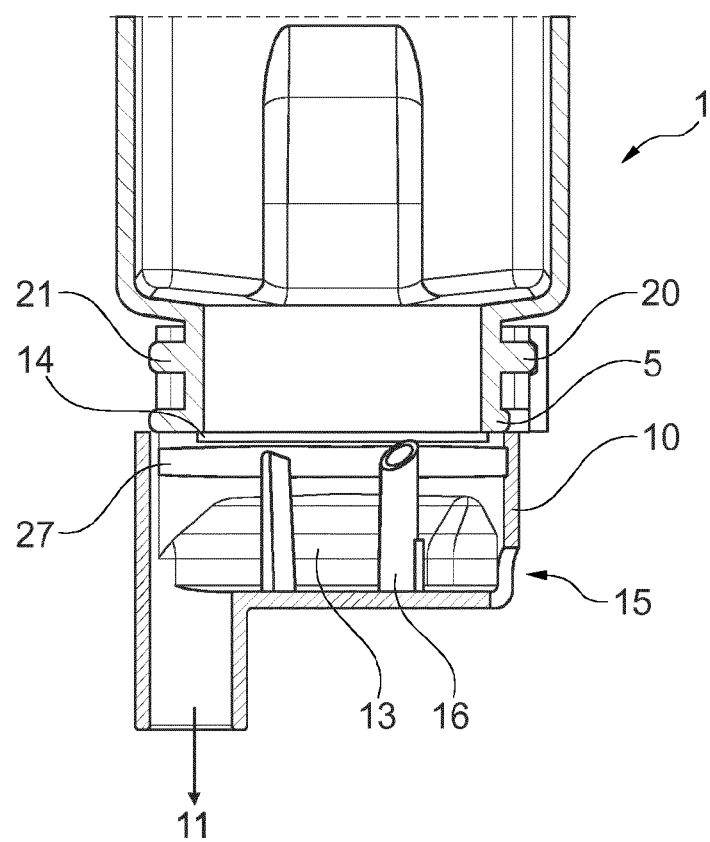
FIGS. 5-8 show a further embodiment of the system according to the invention.
Figure 6:
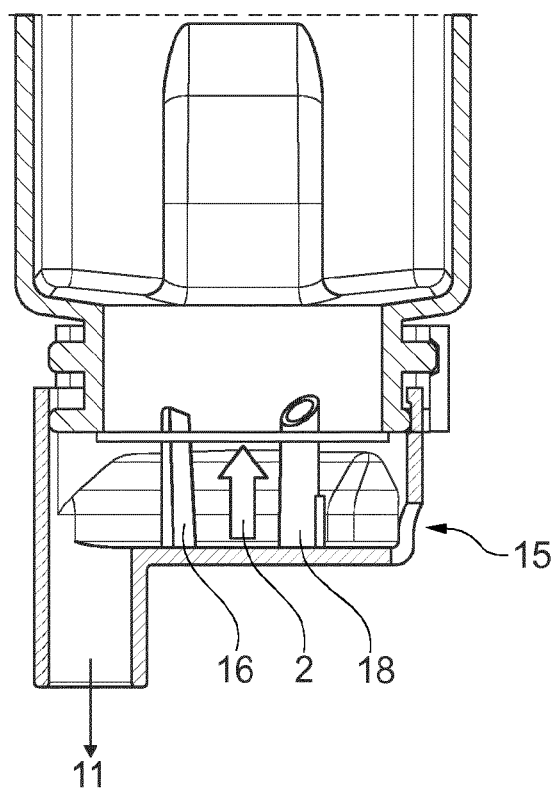
Figure 7:
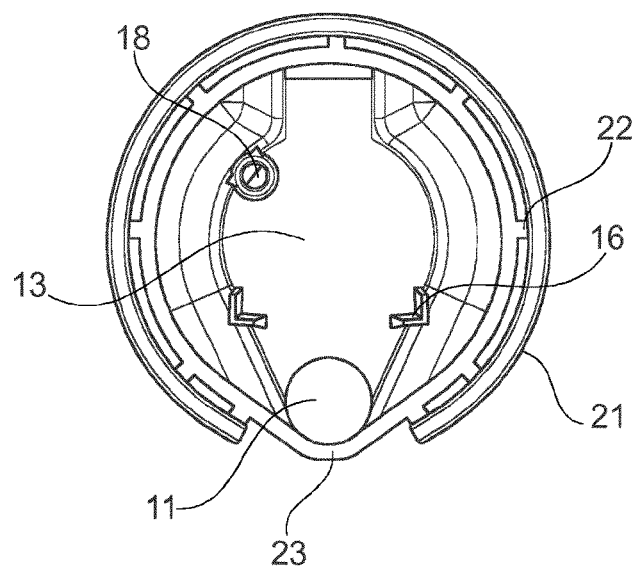
Figure 7:
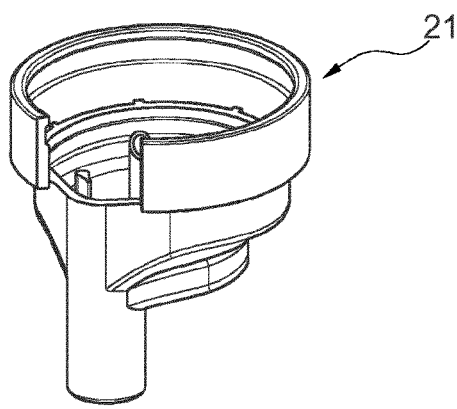
Figure 7:
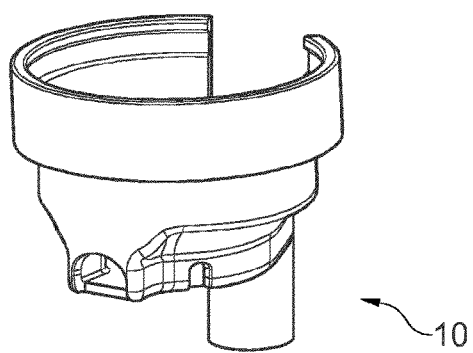
Figure 8:
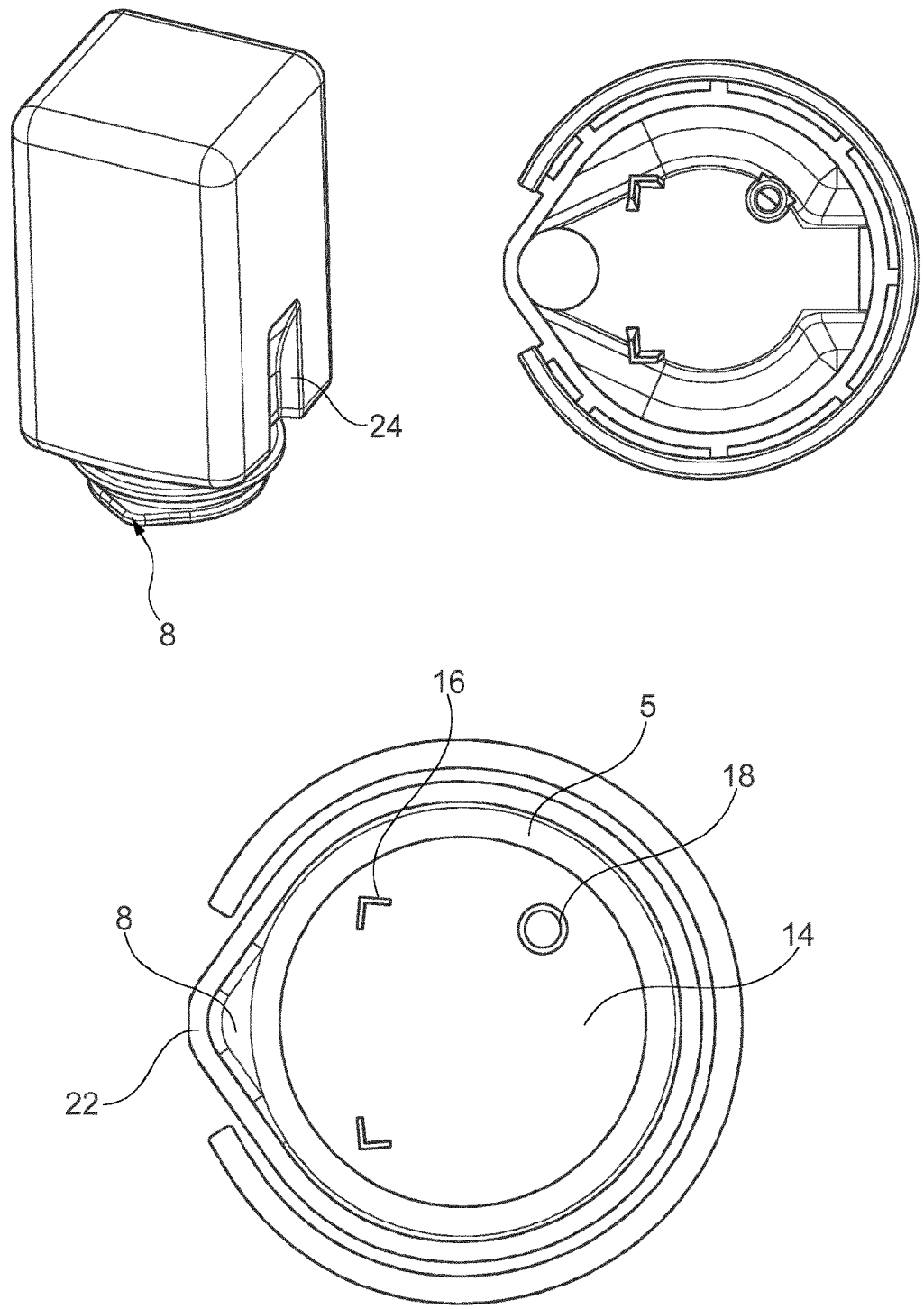

FIG. 5 shows the system prior to piercing. FIG. 6 shows the system after the membrane has been pierced. By way of a relative movement, illustrated by means of arrow 2, between the mixing chamber 13 and the cartridge 1, the predetermined deformation points and/or predetermined breaking points 22 are deformed or destroyed, respectively, such that the cartridge can move together with the ring 21 in the direction of the mixing chamber 13. As a result of this movement, in which the flange 5 is also introduced into the groove 27 and cooperates with the latter in a sealing manner, the membrane 14 is perforated and the substrate can flow out of the cartridge into the mixing chamber, in which it is mixed with a solvent, which is metered into the mixing chamber through the diluent, in particular water, inflow 15, and leaves the mixing chamber through the beverage and/or foodstuff outflow 11.

Figure 9:
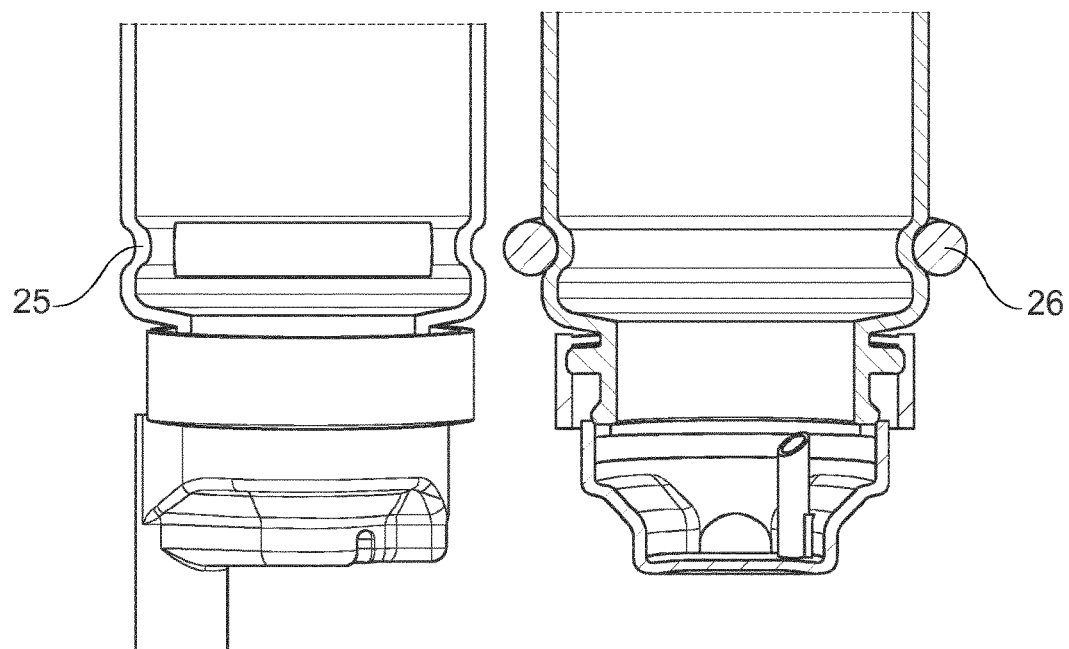
FIG. 9 shows an embodiment with a fastening means.

FIG. 9 shows a fastening means, in this case a groove 25, in the wall region of the cartridge. It is possible for a fastening means 26, with which the cartridge is fastened to a dispenser, to engage in this groove.

Figure 10:
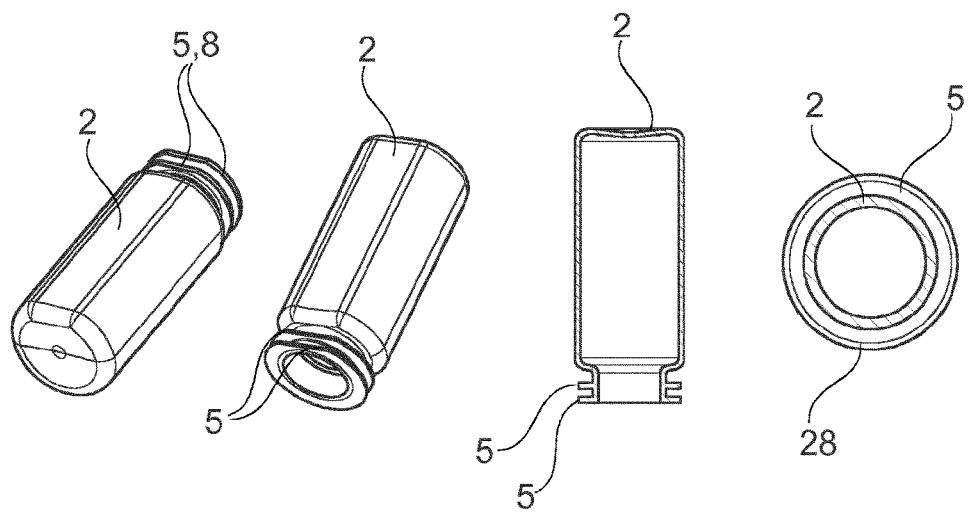
FIG. 10 shows a cartridge of a cartridge system according to a further embodiment of the present invention.

FIG. 10 illustrates four depictions of a cartridge 2 according to one exemplary embodiment. The cartridge 2 is similar in terms of its function to the cartridge 2, explained with by way of FIGS. 1 to 4, according to the first embodiment of the present invention.

However, the cartridge 2 shown in FIG. 10 has, by contrast, two flanges 5. Both flanges 5 serve to fasten the cartridge receptacle 10 to the cartridge 2. In addition, the membrane 14 is sealed to the outer flange 5.

The cross section (perpendicular to the longitudinal axis of the cartridge 2) of the two flanges 5 has a substantially round circumference, wherein a rectilinear circumferential region 28 is provided on one side. In the rectilinear or flattened circumferential region 28, the circumference extends as a virtually straight line (visible on the underside of the flange 5 in the right-hand depiction in FIG. 10), while the circumference of the flange 5 away from the rectilinear circumferential region 28 extends as a curved line. The rectilinear circumferential region 28 serves as a positioning means, by way of which the orientation of the cartridge 2 is fixed with respect to the cartridge receptacle 10.

Figure 11:
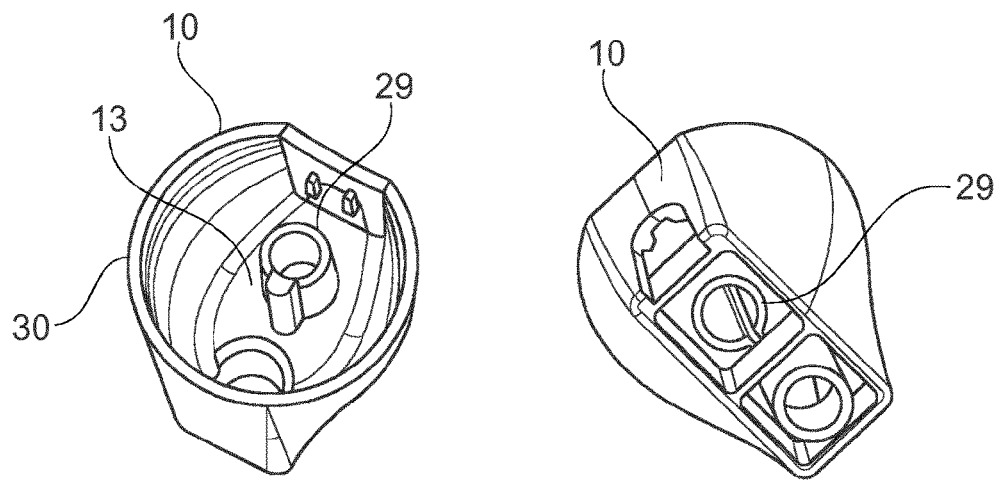
FIG. 11 shows a cartridge receptacle of a cartridge system according to the further embodiment of the present invention.

In FIG. 11, the matching cartridge receptacle 10 can be seen. It is apparent that the circumference of the cartridge receptacle 10 has a shape corresponding to the contour of the two flanges 5 illustrated in FIG. 10, such that the cartridge 2 and cartridge receptacle 10 can be connected together only in a particular orientation with respect to one another. The rectilinear circumferential region 28 thus serves as a twist prevention means. Advantageously, this also defines the region of the cartridge 2 in which the gas is pushed into the cavity.

Arranged within the mixing chamber 13 is a spike guide 29 in which the spike 16 (also referred to as piercing means) is guided in a movable manner. Thus, in the further embodiment, the perforation of the membrane 14 is not brought about by a relative movement between the cartridge 1 and cartridge receptacle 10, but rather the spike 16 is guided in a movable manner in the cartridge receptacle 10 that is fixed relative to the cartridge 1. In this way, the spike 16 can be transferred from a retracted position (corresponds especially to the initial state of the system), in which the spike 16 is away from the membrane 14, into an extended position, in which the spike 16 protrudes into the cavity of the cartridge 1 and in the process perforates the membrane 14. In this extended position, the cartridge 1 is thus opened and the substance can pass through outflow channels 17 in the outer face of the spike 16, past the membrane 14, and into the mixing chamber 13.

On a side of the cartridge receptacle 10 that faces the cartridge 2, a latching strip 30 is provided, which, in order to fasten the cartridge 2 to the cartridge receptacle 10, engages around one of the two flanges 5 in a form-fitting and/or force-fitting manner. In this way, a relative movement between the cartridge 1 and cartridge receptacle 10 is prevented.

Figure 12:
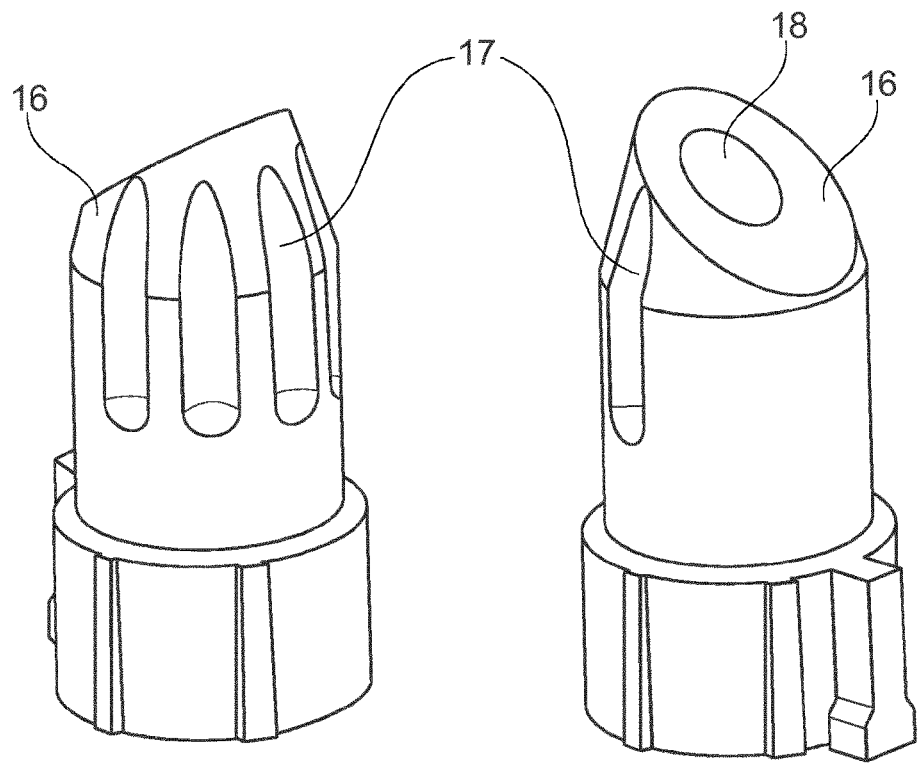
FIG. 12 shows a spike of the cartridge receptacle according to the further embodiment of the present invention.

FIG. 12 illustrates a schematic view of a spike 16 which is guided in the spike guide 29 shown in FIG. 11. The spike 16 has the inner channel 18 for feeding gas into the cartridge 2, and the outer outflow channels 17, through which the substrate can flow past the sealing foil pierced by means of the spike 16 and into the mixing chamber 13. A compressed-air connection of the compressed-air line 34 for connecting to a compressed-air source is formed on a side of the spike 16 that is remote from the cartridge 1, said compressed-air connection being accessible from outside the cartridge receptacle 10, wherein a compressed-air outlet of the compressed-air line 34 for blowing the compressed air into the cartridge 1 is formed on a side of the spike 16 that faces the cartridge 1.

The spike 16 is mounted in a displaceable manner in the spike guide 29 such that it can be moved from a retracted position, in which it is away from the sealing foil on the cartridge 2, into an extended position, in which it projects into the cavity of the cartridge 2 and in the process pierces the sealing foil.

An arrangement in which the spike shown in FIG. 12 is arranged in the spike guide of the cartridge receptacle 10 shown in FIG. 11 and the cartridge receptacle 10 shown in FIG. 11 is then connected to the cartridge 2 shown in FIG. 10 represents a cartridge system according to a further exemplary embodiment of the present invention.

The present teachings envision any of the following features of a cartridge or system in any combination: a cartridge having a wall region, one end of which is adjoined by a connecting region which is closed in particular by a membrane, and at the opposite end of which optionally a bottom region is provided, the wall region and optionally the bottom region define a cavity which accommodates a beverage substrate and/or foodstuff substrate, the connecting region has at least one flange which is provided with a positioning means and/or covering means; the positioning means and/or covering means is an indentation and/or protrusion which protrudes from the flange, in particular the circumference thereof; the positioning means and/or covering means comprises a rectilinear circumferential region of the at least one flange, the circumference of the flange is formed in a preferably curved manner away from the rectilinear circumferential region, an edge extending parallel to the longitudinal axis of the cartridge is particularly preferably formed in each transition region between the rectilinear circumferential region and the curved circumferential region; a neck is provided between the wall region and the connecting region; the membrane is provided on the flange; a fastening means is provided in the wall region and/or in the region of the neck; the cartridge has two flanges which are arranged in an offset manner with respect to one another in the longitudinal direction of the cartridge, only one of the two flanges or both flanges have the positioning means and/or covering means; a cartridge receptacle, such as of a system, which is provided in the connecting region of the cartridge; the cartridge receptacle optionally has a piercing means which perforates the membrane, a diluent, in particular water, inflow, a mixing chamber in which the beverage substrate and/or foodstuff substrate is mixed with the diluent, and a beverage and/or foodstuff outflow; the inflow and the outflow are provided at opposite ends of the cartridge receptacle; the piercing means is provided in a manner aligned with the inflow and the outflow; with regard to the direction of flow of the solvent or diluent, the flow cross section of the mixing chamber first expands and then narrows again; a covering means covers the outflow of the cartridge receptacle; the flange cooperates in a sealing manner with the cartridge receptacle; the cartridge and the cartridge receptacle are connected together in a rotationally fixed manner; the cartridge receptacle has a spike guide and the piercing means is mounted in a displaceable manner within the spike guide, the piercing means is displaceable between a retracted position, in which the piercing means is away from the membrane, and an extended position, in which the piercing means pierces the membrane and projects into the cartridge; at least one lateral channel for conveying the beverage substrate and/or foodstuff substrate in the direction of the mixing chamber when the membrane is pierced by the piercing means has been introduced into the outer wall of the piercing means; a compressed-air line is integrated into the piercing means, and a compressed-air connection of the compressed-air line for connecting to a compressed-air source is formed on a side of the piercing means that is remote from the cartridge, the compressed-air connection being accessible in particular from outside the cartridge receptacle, and a compressed-air outlet of the compressed-air line for blowing the compressed air into the cartridge is formed on a side of the piercing means that faces the cartridge.

LIST OF REFERENCE SIGNS

1 Cartridge
2 Direction of movement

3 Neck
4 Connecting region
5 Flange
6 Wall region
7 Bottom region
8 Positioning and/or covering means, indentation and/or protuberance
9 Inflow of the substance, piercing means
10 Cartridge receptacle
11 Outflow of substance plus solvent/water
12 Direction of flow of substance plus solvent/water
13 Mixing chamber
14 Closure, membrane
15 Solvent inflow, water inflow
16 Piercing means, spike
17 Outflow channels
18 Gas inlet
19 Seal, collar seal
20 Fastening means, collar
21 Fastening ring, securing ring
22 Deformation and/or predetermined breaking point
23 Indentation and/or protuberance of the cartridge receptacle
24 Indentation, guide
25 Form-fitting means for a fastening means 26
26 Fastening means
27 Sealing means, groove
28 Rectilinear circumferential region
29 Spike guide
30 Latching strip
31 Compressed-air line

The invention claimed is:

1. A cartridge having:
a wall region;
a connecting region adjoined to one end of the wall region and which is closed by a membrane;
optionally a bottom region is provided at an opposite end of the wall region;
wherein the wall region, and optionally the bottom region, define a cavity which accommodates a beverage substrate, a foodstuff substrate, or both the beverage substrate and the foodstuff substrate;
wherein the connecting region has at least one flange which is provided with a positioning means;
wherein the positioning means comprises a rectilinear circumferential region of the at least one flange;
wherein a circumference of the flange is formed in a curved manner away from the rectilinear circumferential region; and
wherein a neck is provided between the wall region and the connecting region.

2. The cartridge according to claim 1, wherein an edge extending parallel to a longitudinal axis of the cartridge is formed in each transition region between the rectilinear circumferential region and a curved circumferential region.

3. The cartridge according to claim 1, wherein the membrane is provided on the flange.

4. The cartridge according to claim 1, wherein a fastening means is provided in the wall region, in a region of the neck, or both.

5. The cartridge according to claim 1, wherein the cartridge has two flanges which are arranged in an offset manner with respect to one another in a longitudinal direction of the cartridge, and wherein only one of the two flanges or both flanges have the positioning means.

6. A system having:
the cartridge according to claim 1, and
a cartridge receptacle which is provided in the connecting region of the cartridge.

7. The system according to claim 6, wherein the cartridge receptacle has:
a piercing means which perforates the membrane;
a diluent inflow;
a mixing chamber in which the beverage substrate, the foodstuff substrate, or both the beverage substrate and the foodstuff substrate is mixed with a diluent; and
a beverage and/or foodstuff outflow.

8. The system according claim 7, wherein the diluent is water.

9. The system according to claim 7, wherein the diluent inflow and the beverage and/or foodstuff outflow are provided at opposite ends of the cartridge receptacle.

10. The system according to claim 7, wherein the piercing means is provided in a manner aligned with the diluent inflow and the beverage and/or foodstuff outflow.

11. The system according to claim 7, wherein with regard to a direction of flow of the diluent, a flow cross section of the mixing chamber first expands and then narrows again.

12. The system according to claim 7, wherein a covering means covers the beverage and/or foodstuff outflow of the cartridge receptacle.

13. The system according to claim 7, wherein the cartridge receptacle has a spike guide, and wherein the piercing means is mounted in a displaceable manner within the spike guide;
wherein the piercing means is displaceable between a retracted position, in which the piercing means is away from the membrane, and an extended position, in which the piercing means pierces the membrane and projects into the cartridge.

14. The system according to claim 7, wherein at least one lateral channel for conveying the beverage substrate, the foodstuff substrate, or both the beverage substrate and the foodstuff substrate in a direction of the mixing chamber when the membrane is pierced by the piercing means has been introduced into an outer wall of the piercing means.

15. The system according to claim 7, wherein a compressed-air line is integrated into the piercing means; and
wherein a compressed-air connection of the compressed-air line configured to connect to a compressed-air source is formed on a side of the piercing means that is remote from the cartridge;
wherein the compressed-air connection is accessible from outside the cartridge receptacle; and
wherein a compressed-air outlet of the compressed-air line for blowing the compressed air into the cartridge is formed on a side of the piercing means that faces the cartridge.

16. The system according to claim 6, wherein the flange cooperates in a sealing manner with the cartridge receptacle.

17. The system according to claim 6, wherein the cartridge and the cartridge receptacle are connected together in a rotationally fixed manner.

* * * * *